J. KEHOE.
PROCESS FOR FORCING THE GROWTH OF VEGETATION.
APPLICATION FILED JUNE 6, 1918.
1,278,676. Patented Sept. 10, 1918.
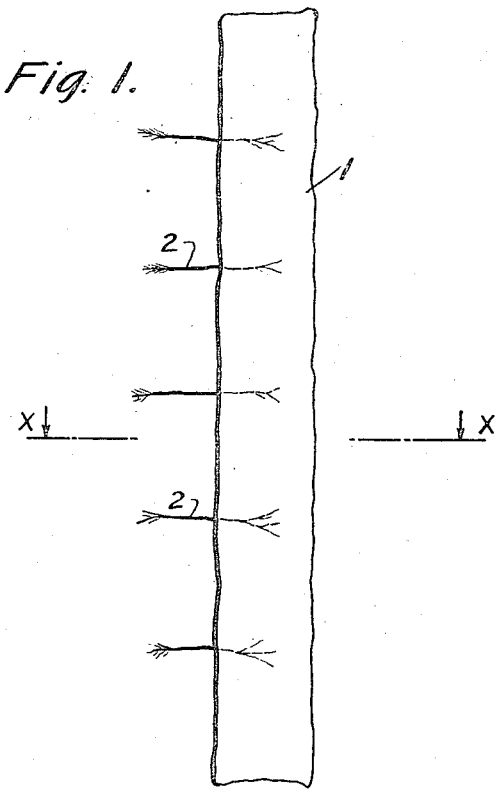
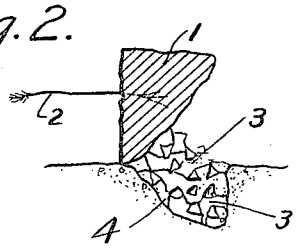
INVENTOR
John Kehoe
BY
Fred P. Goin
ATTORNEY

UNITED STATES PATENT OFFICE.

JOHN KEHOE, OF SEATTLE, WASHINGTON.

PROCESS FOR FORCING THE GROWTH OF VEGETATION.

1,278,676.  Specification of Letters Patent.  Patented Sept. 10, 1918.

Application filed June 6, 1918.  Serial No. 238,492.

*To all whom it may concern:*

Be it known that I, JOHN KEHOE, citizen of the United States, residing at Seattle, in the county of King and State of Washington, have invented certain new and useful Improvements in Processes for Forcing the Growth of Vegetation, of which the following is a specification.

This invention relates to a process for forcing the growth of out door vegetation in contra-distinction to the usual method of hot house treatment. My invention will be more fully understood from a reading of the following specification together with the accompanying drawings.

In the drawings Figure 1 is a plan view of an upturned furrow of growing grain and Fig. 2 is a cross section upon the line $x$—$x$ of Fig. 1.

Referring now more particularly to the drawings, numeral 1 indicates the upturned furrow. 2 indicates the growing vegetation, 3 loose clods of earth which have fallen in the earth cavity 4.

In my improved process it is necessary that grain or other vegetation be planted in rows running east and west. In the forenoon a furrow is run along beneath each row by any suitable means but I prefer to use what is known as a "hill side plow" for this purpose whereby the earth within which grows the grain or other vegetation is turned up so that the rays of the morning sun impinge almost directly against the under side of the upturned furrow wherein the vegetation grows as seen in Fig. 2.

The furrows 1 are left in this condition until well along in the afternoon, when the body of earth represented by the upturned furrow is replaced in the hollow 4. It will be understood, of course, that a man will estimate in the morning about how many furrows he can turn over in a given time so that he will not up-turn any more of furrows in the forenoon than he will have time to replace, as above indicated, before the sun goes down, or nearly so. The result of these connected steps in my improved process is that, since all of the earth banks represented by furrows 1 are exposed to the warm sun rays the earth around the tendrils of the growing plants will be warmed much more than it would be in the usual course of cultivation now known to the art. It is also clear that the bottom of the banks of earth in the upturned furrow, as well as the hollows 4, having been warmed as above indicated, the heat will be retained around the roots of the tendrils long after the earth banks have been turned back into the hollows 4 and produce a much more rapid growth than is possible with the usual process of cultivation. It is quite essential that the earth banks be replaced in the cavity 4 before the sun goes down as is obvious.

I have shown a particular succession of steps of my improved process but I am aware that slight changes in the same will readily suggest themselves to others skilled in the art without departing from the spirit and scope of my invention and I therefore desire to avoid being limited to the exact details hereinabove set forth except as pointed out in the appended claim.

Having described my invention what I claim as new and desire to protect by Letters Patent, is—

The process of forced growth consisting of planting rows of vegetation running substantially east and west, upturning the earth directly beneath the said rows, whereby the under portion of the same is exposed to the sun's rays which allows the upturned earth to become warm; and replacing the said furrow into its hollow before the sun's rays have ceased to impinge upon it.

In testimony whereof I affix my signature in the presence of two witnesses.

JOHN KEHOE.

Witnesses:
 MARGUERITE LEYDA,
 GENEVA ELDER.

Copies of this patent may be obtained for five cents each, by addressing the "Commissioner of Patents, Washington, D. C."